United States Patent [19]
Ruckdeschel et al.

[11] Patent Number: 6,056,319
[45] Date of Patent: May 2, 2000

[54] GAS GENERATOR FOR A SAFETY DEVICE

[75] Inventors: Rolf Ruckdeschel, Schwangau; Werner Müller, Mühldorf/Inn, both of Germany

[73] Assignee: TRW Airbag Systems GmbH & Co. KG, Aschau/Inn, Germany

[21] Appl. No.: 09/159,969

[22] Filed: Sep. 24, 1998

[30] Foreign Application Priority Data

Sep. 24, 1997 [DE] Germany .......................... 197 42 204

[51] Int. Cl.$^7$ ................................................ B60R 21/26
[52] U.S. Cl. ............................................................ 280/741
[58] Field of Search ............................................. 280/741

[56] References Cited

U.S. PATENT DOCUMENTS

| | | |
|---|---|---|
| 5,046,429 | 9/1991 | Swann et al. ............................ 280/741 |
| 5,221,109 | 6/1993 | Marchant ................................. 280/741 |
| 5,529,335 | 6/1996 | Böhmler ................................... 280/741 |
| 5,602,359 | 2/1997 | Hambro et al. .......................... 280/741 |
| 5,613,705 | 3/1997 | Hock et al. .............................. 280/741 |

*Primary Examiner*—Kenneth R. Rice
*Attorney, Agent, or Firm*—Tarolli, Sundheim, Covell, Tummino & Szabo L.L.P.

[57] ABSTRACT

The invention relates to a gas generator for a safety device, in particular for a vehicle occupant restraint system, comprising a housing of insulating material, a combustion chamber formed in the housing containing solid propellant for the production of hot gas, and with an igniter inserted into the housing and projecting into the combustion chamber. The gas generator is wherein the housing is constructed so as to be conductive in the region of the igniter, and the solid propellant and, optionally, the combustion chamber, is arranged in a conductive container, the conductive region of the housing and the conductive container being in conducting connection with each other.

11 Claims, 3 Drawing Sheets

GAS GENERATOR FOR A SAFETY DEVICE

The invention relates to a gas generator for a safety device, in particular for a passive vehicle occupant restraint system.

BACKGROUND OF THE INVENTION

Usually, such a gas generator contains a housing with a combustion chamber formed therein, into which chamber a pyrotechnic solid propellant is filled. To activate the solid propellant, an igniter is provided which is inserted into an opening of the housing and projects into the combustion chamber. In the wall of the housing delimiting the combustion chamber there are several outflow openings for the gases which are released,on combustion of the propellant. These gases are then supplied to the safety device, in particular to an inflatable gas bag or to a knee protector which is able to be activated pneumatically.

In recent times, it has been proposed to construct the gas generator housing from plastic, in particular from fibrereinforced plastic, to save weight. A proposal for the construction of gas generators with a plastic housing has been described for example in the thesis written by Frau Karen Reichart entitled "Airbag-Gasgeneratorgehause aus faserverstarktem Kunststoff", University of Rostock, Faculty of Mechanical Engineering and Marine Technology, Engineering Institute, published in September 1995. In this thesis, reference is already made to the fact that gas generator housings formed from fibre-reinforced plastic require particular measures to prevent an electrostatic charging. In this context, it is proposed in the said thesis to provide the gas generator housing either with a steel casing or else to metallize it galvanically. These measures can indeed reduce the high surface resistance of the plastic housing. However, they require additional components and/or production steps in the manufacture of the gas generator and are therefore not able to be realized at a favourable cost.

From the DE-C2-38 24 162 it is known, in addition, to pack the solid propellant in an airtight manner by means of an aluminium foil, for protection against moisture, a detection of any leaks being made possible by evacuating the aluminium foil.

There is therefore still a need for gas generators which are able to be produced at a favourable cost with a plastic housing, the pyrotechnic components of which are protected from ignition by electrostatic charge and its conductive discharge.

SUMMARY OF THE INVENTION

The invention provides a gas generator for a safety device, in particular a gas generator for a vehicle occupant restraint system, which comprises a housing of insulating material, a combustion chamber formed in the housing with solid propellant for the production of hot gas, and an igniter inserted into the housing and projecting into the combustion chamber. The gas generator according to the invention is wherein the housing is constructed so as to be conductive in the region of the igniter, and the solid propellant and also, if necessary, the combustion chamber, is arranged in a conductive container, the conductive region of the housing and the conductive container being in conducting connection with each other.

A gas generator of a non-metallic, non-conductive material is realized by the invention, the pyrotechnic and, if necessary, electronic components of which are effectively protected from an ignition or destruction by electrostatic charge and its conductive discharge. In addition, electromagnetic radiation is reliably shielded and a protection of the pyrotechnic components is achieved in the case of a possible mechanical destruction of the housing.

In a particularly preferred embodiment of the invention, the gas generator housing is sprayed with a conductive lacquer in the region of the igniter. Advantageously, the gas generator housing can also be provided with a conductive insert piece in the region of the igniter. Finally, it is proposed as a further embodiment according to the invention, to construct the gas generator housing from a conductive plastic in the region of the igniter. Such plastics are known to those skilled in the art and can be selected according to mechanical requirements to be set for the gas generator housing.

In all embodiments the conductive container containing the propellant and/or the combustion chamber is preferably in direct, conducting connection with the conductive housing parts in the region of the igniter. Through this, a potential difference is prevented from being able to build up between the housing surface and the propellant, which difference flows off via the igniter and hence brings about an ignition of the propellant.

DESCRIPTION OF THE DRAWINGS

Further features and advantages of the invention will be apparent from the following description of several embodiments and from the drawing to which reference is made. In the drawing.

DESCRIPTION OF PREFERRED EMBODIMENTS

Figure 1:
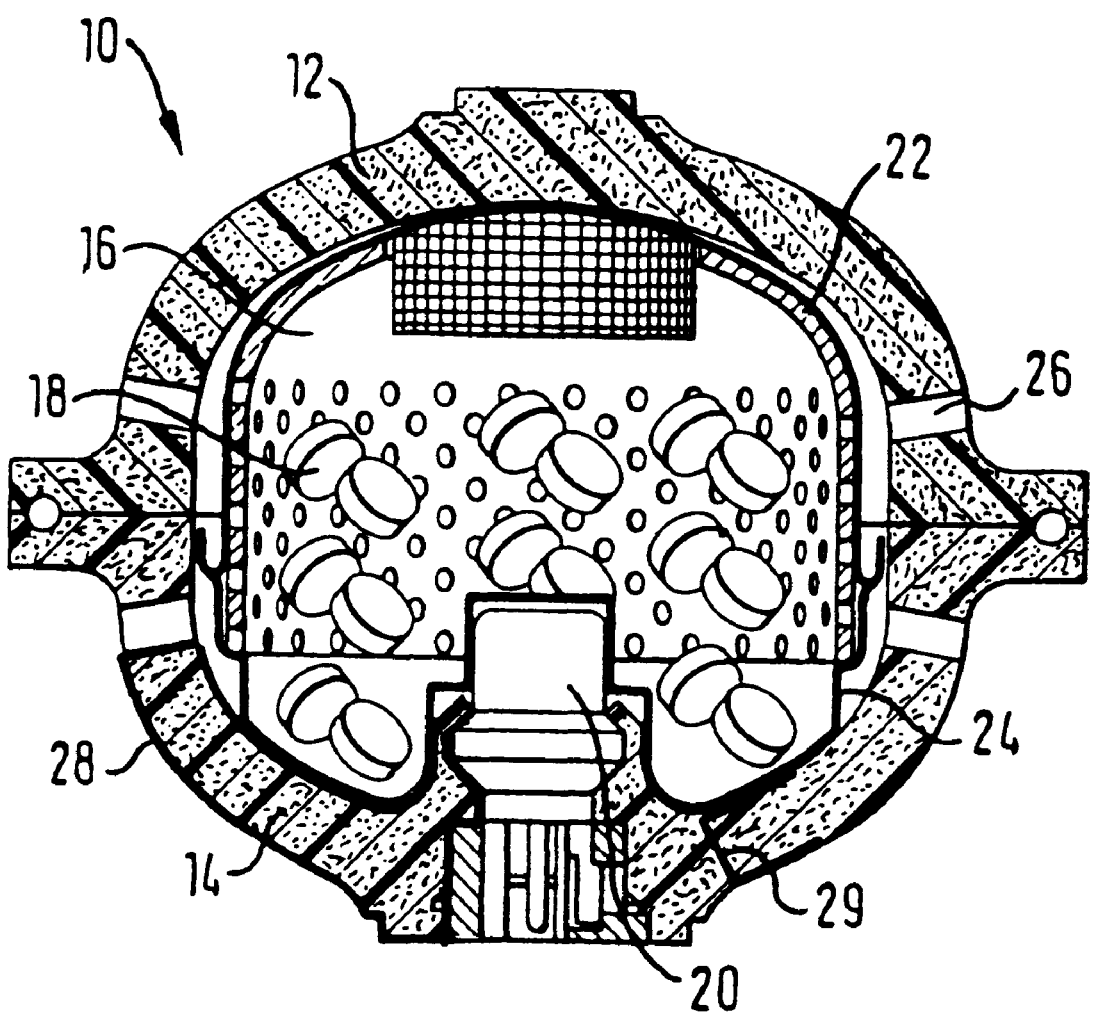
FIG. 1 shows a sectional view of an embodiment of the gas generator according to the invention.

The gas generator 10 illustrated in FIG. 1 has a housing composed of a upper housing part 12 and a lower housing part 14. The two housing parts 12, 14 are connected firmly with each other by known types of connection, such as for example welding or glueing. Both housing parts consist of an insulating material, preferably of a plastic reinforced with glass fibres and/or carbon fibres, the fibre content of which preferably amounts to between 30 and 50 wt.-%. Particularly preferably, the plastic is a glass-fibre-reinforced polyamide.

Inside the gas generator housing 12, 14 a combustion chamber 16 is formed, with a solid propellant 18 contained therein for the production of hot gas. The solid propellant is preferably present in tablet form, however it can also have a different form known in the art. An igniter 20 is inserted into the lower housing part 14, which igniter 20 projects into the combustion chamber 16.

In the embodiment illustrated here, both the solid propellant 18 and also, the combustion chamber housing 22 defining the combustion chamber 16 are surrounded by a container 24 of conductive material, preferably aluminium. The container 24 is preferably of an air- and moisture-tight aluminium foil, which encloses the propellant and the combustion chamber housing and is at least partially evacuated. However, it is also conceivable to only enclose the propellant in a conductive casing of aluminium. Several outflow openings 26 are provided in the wall of the housing 12, 14 distributed over the periphery of the housing, which outflow openings 26 are in flow connection with the interior volume of an inflatable gas bag.

In the embodiment illustrated in FIG. 1, the lower housing part, or at least a region of the lower housing part 14 adjoining the igniter 20, is sprayed with a conductive lacquer 28. The conductive aluminium foil 24 is in direct contact with the conductive lacquer 28 which is also sprayed on the inner face of the lower housing part 14, and is therefore in conducting connection with the outer face of the lower housing part 14.

In a further embodiment shown in FIG. 1, in the production of the lower housing part 14 a conducting insert piece 29, constructed here approximately in a U-shape, is arranged in the region of the igniter 20 and is molded around with the plastic material of the lower housing part 14. Also in this embodiment a conducting connection is produced between the aluminium foil lying against the inner face of the lower housing part 14 in the region of the igniter 20, and the outer face of the lower housing part 14.

Figure 2:
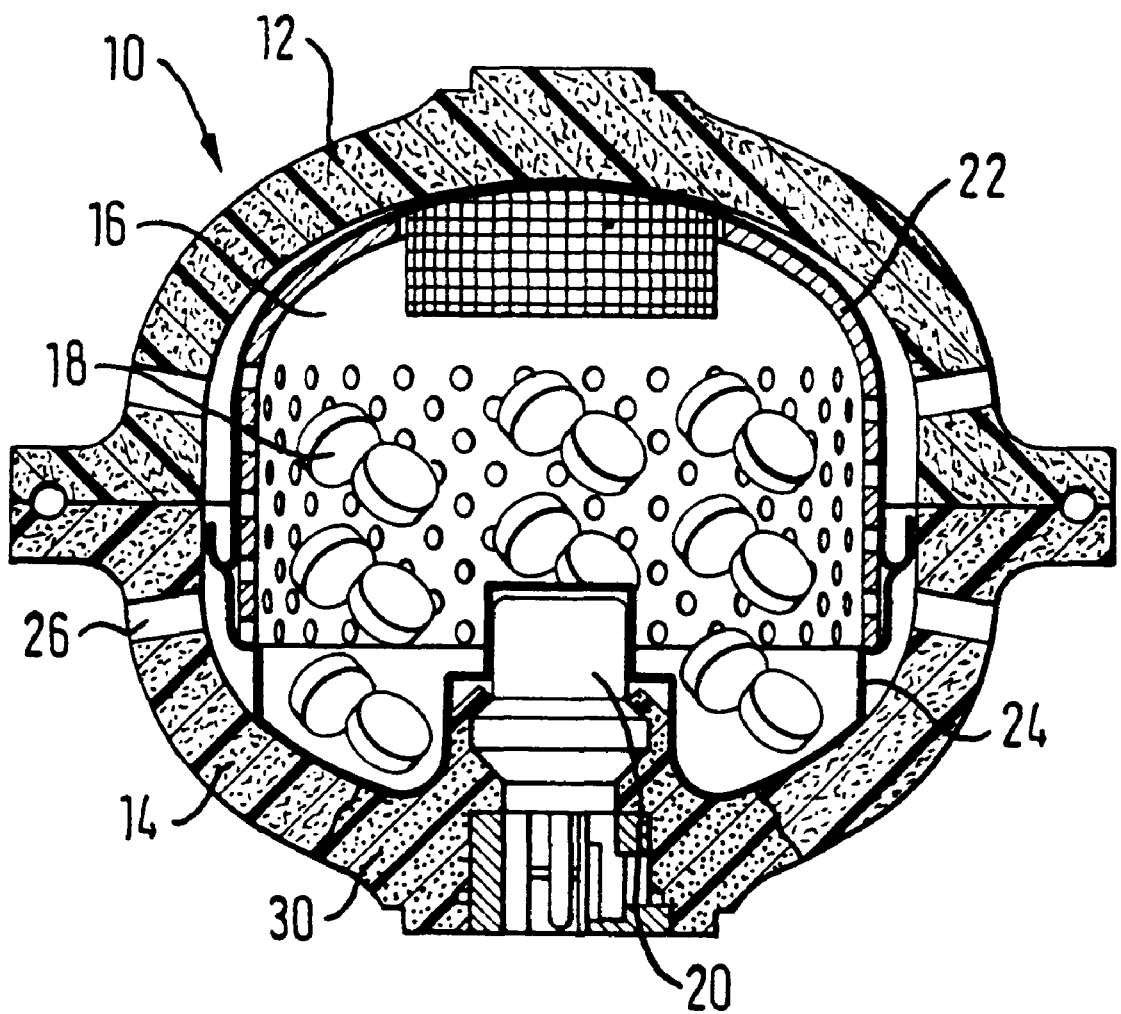
FIG. 2 shows a sectional view of a further embodiment of the gas generator according to the invention.

FIG. 2, finally, shows a further embodiment of the gas generator according to the invention, the basic construction of which coincides with the gas generator shown in FIG. 1. The same reference numbers designate the same features in this respect. In the embodiment shown here, the lower housing part, at least, however, a region of the lower housing part 14 adjoining the igniter, is formed from a conductive plastic 30. The aluminium container 24 surrounding the propellant 18 and the combustion chamber 16 is on the inner face of the lower housing part 14 in direct, conducting connection with the conducting plastic 30. Therefore, the occurrence of potential differences between the propellant and the gas generator housing and also a voltage break-through via the igniter can be reliably prevented.

Figure 3:
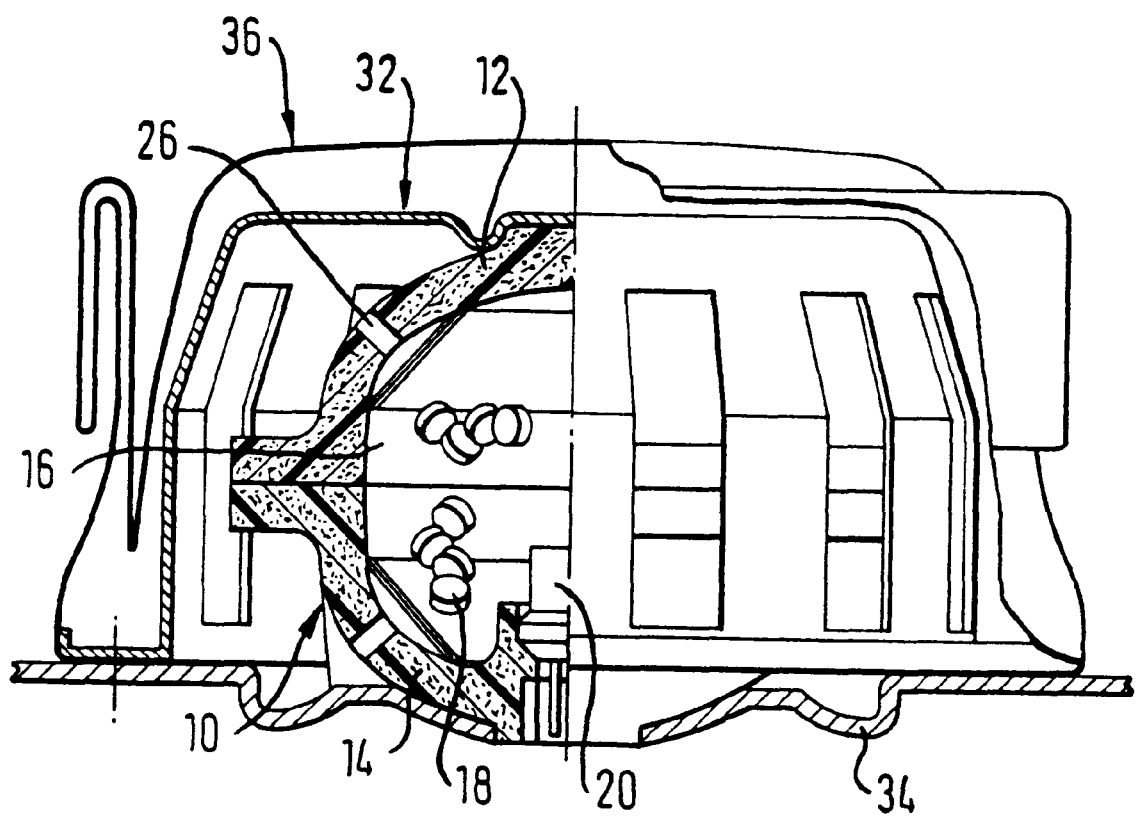
FIG. 3 shows a diagrammatic sketch of the gas generator according to the invention in installed state.

FIG. 3 shows a diagrammatic sketch of the gas generator according to the invention, incoporated in a safety device. The gas generator 10 is secured to the steel trough 34 of the airbag module by means of a clamping device 32. The clamping device 32 holds at the same time the airbag 36 of the safety device which is positioned over the gas generator 10. If an accident is detected by a sensor (not shown here), a current impulse originating from the sensor activates the igniter 20. The latter ignites the solid propellant 18 in the combustion chamber 16 for the production of hot gas, which is supplied via the outflow openings 26 to the interior volume of the airbag 36.

In the case of an electrostatic charging of the gas generator housing 12, 14, which is made from a non-conducting plastic, the danger exists that the charge built up on the housing surface either comes through onto the propellant 18 or flows off via the igniter 20. In both cases, an undesired deflagration of propellant would be brought about. The lower housing part, which according to the invention is constructed so as to be conductive at least in the region of the igniter 20 and which is in conducting connection with a container (not shown here) encasing the propellant 18 and/or the combustion chamber 16, ensures, however, an conductive discharge of the charge built up on the gas generator housing via the steel trough 34 of the airbag module which is to be regarded as earthing. Therefore, the danger of a voltage break-through and hence an undesired deflagration of propellant can be effectively avoided.

We claim:

1. A gas generator for a safety device, in particular for a vehicle occupant restraint system, comprising a housing of insulating material, a combustion chamber formed in the housing containing solid propellant for the production of hot gas, and an igniter inserted into the housing and projecting into the combustion chamber, wherein the housing is constructed so as to be conductive in the region of the igniter, and the solid propellant and, optionally, the combustion chamber, is arranged in a conductive container, the conductive region of the housing and the conductive container being in conducting connection with each other.

2. The gas generator according to claim 1, wherein the insulating material is a fibre-reinforced plastic.

3. The gas generator according to claim 2, wherein the plastic is reinforced with glass fibres and/or carbon fibres.

4. The gas generator according to claim 2, wherein the fibre content amounts to 30 to 50 wt.-%.

5. The gas generator according to claim 2, wherein the plastic is a glass-fibre-reinforced polyamide.

6. The gas generator according to claim 1, wherein the conductive container is an aluminium container.

7. The gas generator according to claim 6, wherein the conductive container is an air- and moisture-tight aluminium foil.

8. The gas generator according to claim 7, wherein the aluminium foil encloses the propellant and is at least partially evacuated.

9. The gas generator according to claim 1, wherein the housing is sprayed with a conductive lacquer in the region of the igniter.

10. The gas generator according to claim 1, wherein the housing is provided with a conductive insert piece in the region of the igniter.

11. The gas generator according to claim 1, wherein the housing is formed from a conductive plastic in the region of the igniter.

* * * * *